(12) United States Patent
Britton

(10) Patent No.: US 11,163,149 B2
(45) Date of Patent: Nov. 2, 2021

(54) BAFFLED CALOTTE DOME OBSERVATION AND/OR COMMUNICATIONS SYSTEM

(71) Applicant: The Aerospace Corporation, El Segundo, CA (US)

(72) Inventor: Matthew C. Britton, Newport Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 302 days.

(21) Appl. No.: 16/257,311

(22) Filed: Jan. 25, 2019

(65) Prior Publication Data
US 2020/0241279 A1  Jul. 30, 2020

(51) Int. Cl.
| G02B 23/16 | (2006.01) |
| G02B 5/00 | (2006.01) |
| G01S 3/786 | (2006.01) |

(52) U.S. Cl.
CPC .............. *G02B 23/16* (2013.01); *G01S 3/786* (2013.01); *G02B 5/003* (2013.01)

(58) Field of Classification Search
CPC ........... G01S 3/786; G02B 23/16; G02B 5/00; G02B 26/023; G02B 5/003; G02B 7/183; E04B 1/346; E04D 13/03
See application file for complete search history.

(56) References Cited

U.S. PATENT DOCUMENTS

| 4,010,365 A * | 3/1977 | Meyers ................. F41G 7/2213 250/236 |
| 4,123,134 A * | 10/1978 | Meyers ................. F41G 7/2213 244/3.16 |
| 4,159,603 A * | 7/1979 | Schroeder ................. E04B 7/00 52/82 |
| 4,695,157 A * | 9/1987 | Schoenbaum ....... G01N 21/474 250/559.17 |
| 4,840,458 A * | 6/1989 | Cliffton .................. G02B 5/005 114/66 |
| 4,918,881 A * | 4/1990 | Cottle ....................... E04H 5/00 52/65 |
| 5,117,606 A * | 6/1992 | Mikami ................. G02B 23/16 244/159.1 |
| 5,189,554 A | 2/1993 | Vanasse et al. |

(Continued)

FOREIGN PATENT DOCUMENTS

| WO | 2012047362 A1 | 4/2012 |
| WO | 2014186081 A1 | 11/2014 |

OTHER PUBLICATIONS

Calotte Dome Comments Page; Retrieved from the internet at https://www.cloudynights.com/topic/203741-calotte-dome/, Nov. 28, 2018.

(Continued)

*Primary Examiner* — Balram T Parbadia
(74) *Attorney, Agent, or Firm* — LeonardPatel PC

(57) ABSTRACT

Baffled Calotte dome observation and/or communications systems are disclosed. For instance, a visible or infrared telescope and associated sensor systems, a laser, etc., may be enclosed in a Calotte dome with a baffle mounted on the opening and a window and/or filter mounted on top of the baffle. The Calotte dome steers the baffle in both elevation and azimuth, enabling the system to point and track objects moving on arbitrary trajectories.

28 Claims, 18 Drawing Sheets

(56) References Cited

U.S. PATENT DOCUMENTS

| | | | | |
|---|---|---|---|---|
| 5,448,860 | A * | 9/1995 | Menke | E04H 5/00 49/125 |
| 6,260,309 | B1 * | 7/2001 | Cliffton | E04H 5/00 359/227 |
| 7,349,804 | B2 | 3/2008 | Belenkii et al. | |
| 7,718,941 | B2 | 5/2010 | Austin et al. | |
| 7,762,677 | B2 | 7/2010 | Lundgren | |
| 8,727,547 | B2 | 5/2014 | McCabe et al. | |
| 2002/0154400 | A1 * | 10/2002 | Belcher | G02B 7/001 359/430 |
| 2005/0183377 | A1 * | 8/2005 | Johnson | B64G 1/66 52/646 |
| 2006/0132608 | A1 * | 6/2006 | BenDaniel | G06T 5/00 348/207.1 |
| 2007/0038374 | A1 | 2/2007 | Belenkii et al. | |
| 2007/0289227 | A1 * | 12/2007 | Parker | E04H 5/00 52/66 |
| 2008/0169413 | A1 | 7/2008 | Austin et al. | |
| 2009/0097124 | A1 | 4/2009 | Lundgren | |
| 2012/0050854 | A1 * | 3/2012 | Capon | G02B 23/16 359/399 |
| 2013/0321893 | A1 | 12/2013 | McCabe et al. | |

OTHER PUBLICATIONS

OLSG Final Report, Retrieved from the internet at https://www.ioag.org/Public%20Documents/OLSG%20Report_Final_06_05_12.pdf, Jun. 5, 2012.

Thirty Meter Telescope Website, retrieved from the internet at http://www.tmt.org, Nov. 28, 2018.

Thompson et al., "Rayleigh Laser Guide Star Systems: Application to the University of Illinois Seeing Improvement System", Publications of the Astronomical Society of the Pacific, 114:1029-1042, 2000 Sep. 2002. The Astronomical Society of the Pacific.

* cited by examiner

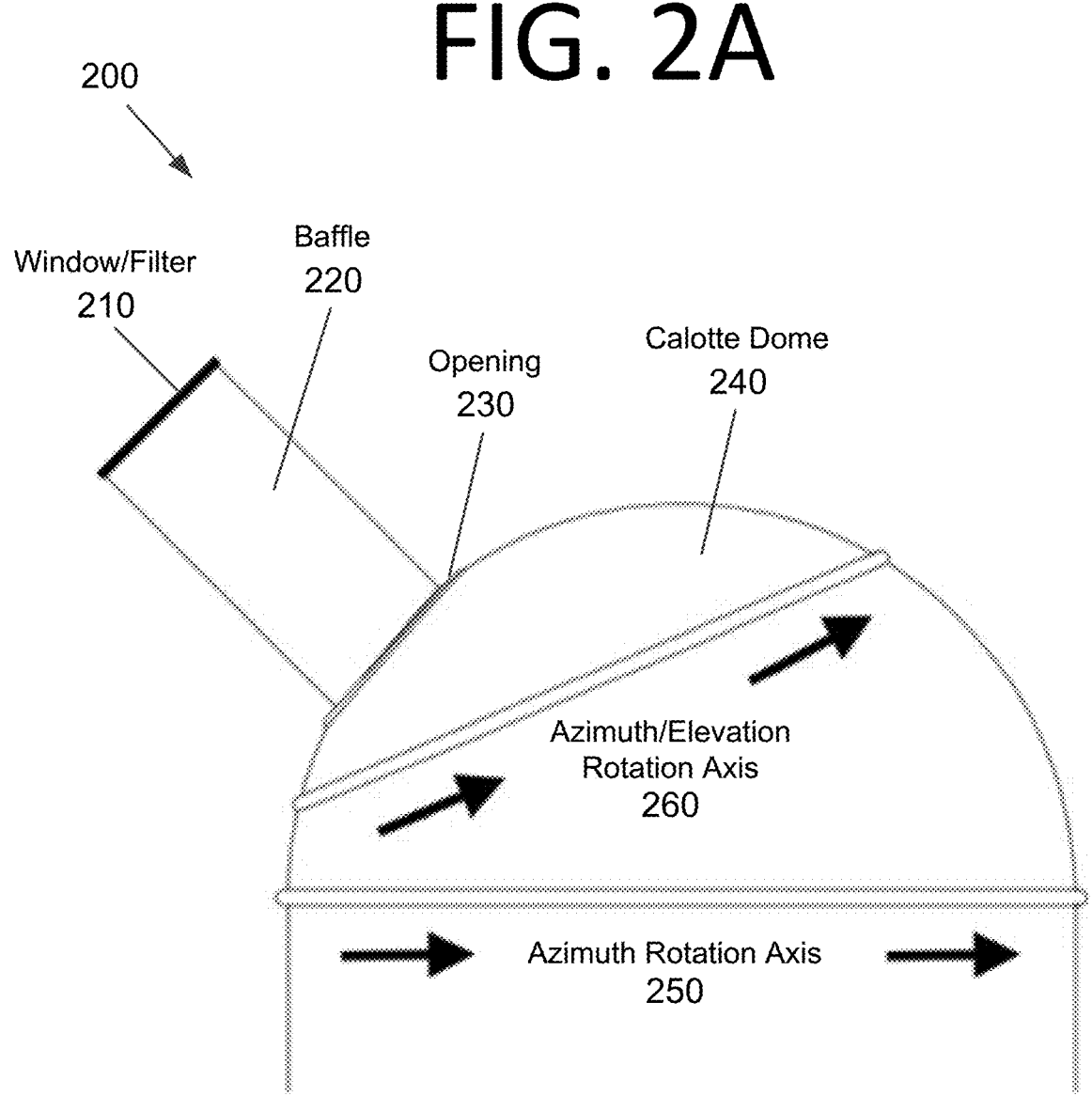

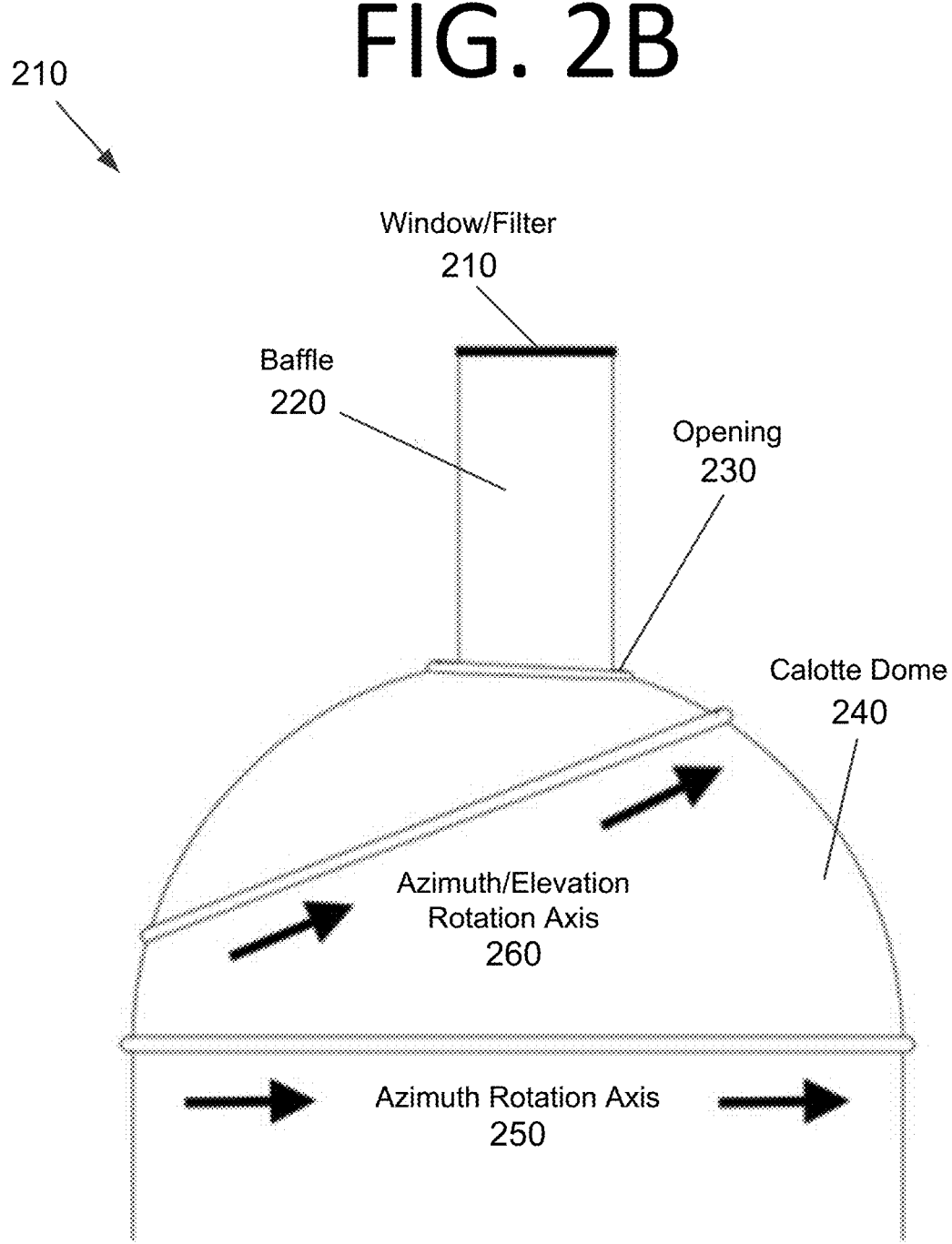

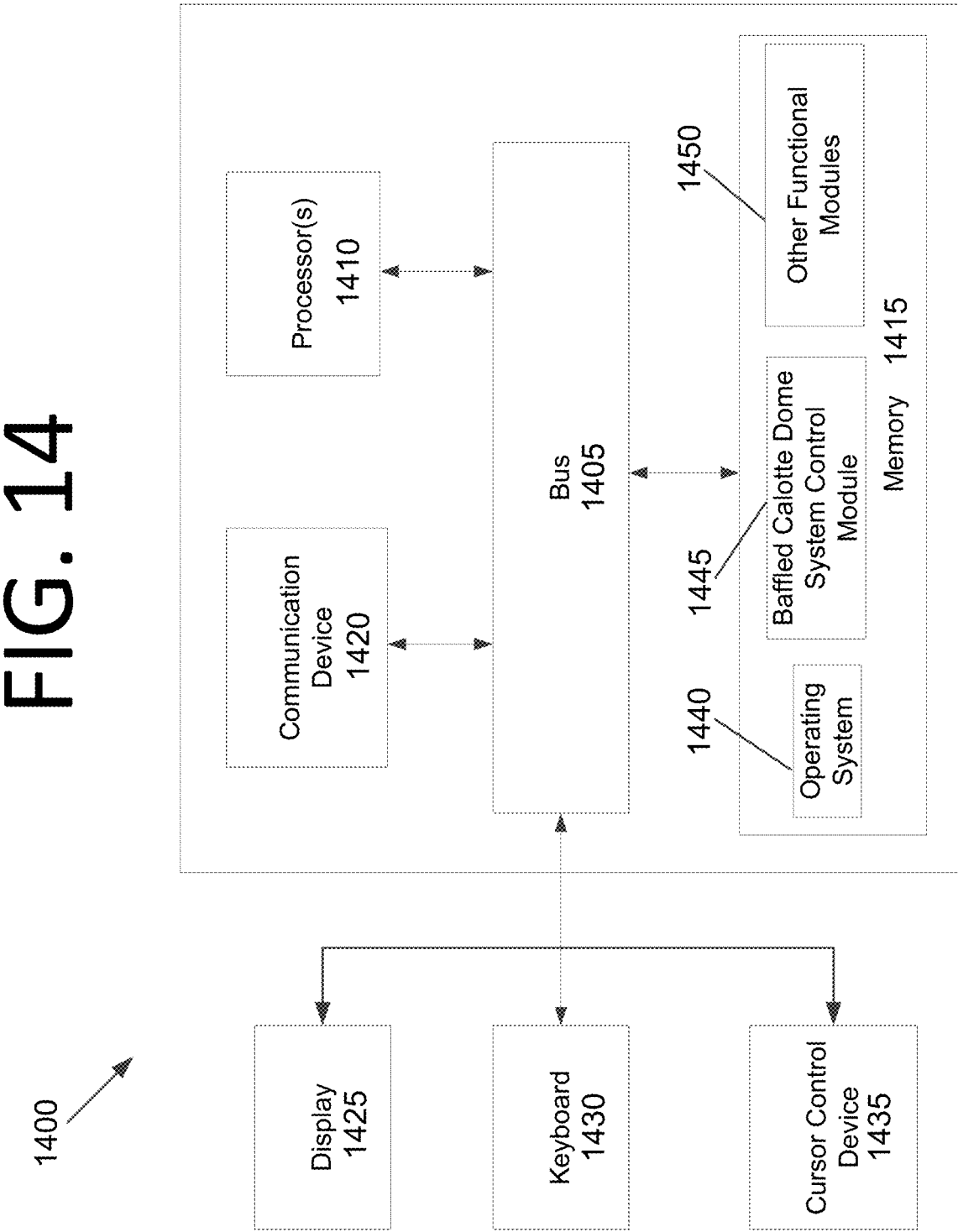

BAFFLED CALOTTE DOME OBSERVATION AND/OR COMMUNICATIONS SYSTEM

FIELD

The present invention generally relates to optics, and more particularly, to a baffled Calotte dome observation and/or communications system, the baffled Calotte dome housing components configured to perform tracking, observations, and/or optical communications.

BACKGROUND

Visible and infrared telescopes are widely employed for pointing and tracking. Applications include astronomy, free space optical communication, satellite tracking, and directed energy. These applications employ an enclosure for the telescope and associated sensor systems, such as cameras and spectrographs. These enclosures may contain an opening and slew to permit the telescope a clear opening to point and track, as is the case with a traditional slit dome. Alternatively, enclosures may open to expose the telescope entirely, as is the case with clamshell or roll-off domes. These types of enclosures are closed during periods when the telescope is not operating to provide protection from environmental elements, such as rain, wind, light, pollution, and animals.

A Calotte dome is a particular type of enclosure that provides an opening minimally sized to match the aperture of a telescope housed within the dome. The Calotte dome provides two axes of rotation to permit the opening to be pointed in elevation and azimuth, as shown in Calotte dome 100 of FIGS. 1A and 1B. Azimuth rotation axis 120 controls azimuth, while azimuth/elevation rotation axis 130 controls both azimuth and elevation. An opening 110 on Calotte dome 100 allows an internally housed telescope (not shown) a view therethrough.

Conventional dome observatories may use domes with large, unbaffled entrance openings (e.g., slits) that are conformal to the observatory dome. These dome openings extend 90° in elevation and are as wide in azimuth as required to provide a clear field of view for the telescope. Conventional dome observatories may use clamshell domes or roll-off domes. However, daytime ambient light through such traditional openings provides very little stray light control and severely hinders or prevents the ability to perform observations during daytime. Accordingly, an improved system and approach may be beneficial.

SUMMARY

Certain embodiments of the present invention may provide solutions to the problems and needs in the art that have not yet been fully identified, appreciated, or solved by conventional optical technologies. For example, some embodiments pertain to a baffled Calotte dome observation and/or communications system. The baffled Calotte dome may house components configured to perform tracking, observations, and/or optical communications.

In an embodiment, an apparatus includes a Calotte dome that includes an opening and a baffle operably connected to the opening of the Calotte dome at a proximal end of the baffle. The apparatus also includes an optical window and/or filter operably connected to a distal end of the baffle. The baffle and the optical window and/or filter are configured to allow light to enter an interior of the Calotte dome, but reduce or eliminate stray solar light from entering the interior of the Calotte dome. The Calotte dome, the baffle, and the optical window and/or filter protect the interior of the Calotte dome from external elements.

In another embodiment, a Calotte dome system includes a Calotte dome including an opening and a baffle operably connected to the opening of the Calotte dome at a proximal end of the baffle. The Calotte dome system also includes an optical window and/or filter operably connected to a distal end of the baffle and a telescope or a laser housed within an interior of the Calotte dome and operably connected to the opening, the baffle, or both. The baffle and the optical window and/or filter are configured to allow light to enter the telescope or allow laser light to be emitted. The Calotte dome, the baffle, and the optical window and/or filter protect an interior of the Calotte dome from external elements.

In yet another embodiment, a Calotte dome system includes a Calotte dome including an opening and a baffle operably connected to the opening of the Calotte dome at a proximal end of the baffle. The Calotte dome system also includes an optical window and/or filter operably connected to a distal end of the baffle and a telescope or a laser housed within an interior of the Calotte dome and spaced apart from and aligned with the opening and the baffle. The baffle and the optical window and/or filter are configured to allow light to enter the telescope or allow laser light to be emitted. The Calotte dome, the baffle, and the optical window and/or filter protect an interior of the Calotte dome from external elements.

In still another embodiment, a Calotte dome system includes a Calotte dome including an opening and a baffle operably connected to the opening of the Calotte dome at a proximal end of the baffle. The Calotte dome system also includes an optical window and/or filter operably connected to a distal end of the baffle, an azimuth/elevation ring housed within the Calotte dome, a telescope or a laser housed within the Calotte dome, and an attachment member that attaches the laser or the telescope to the azimuth/elevation ring such that the laser or telescope rotates with the azimuth/elevation ring. The baffle and the optical window and/or filter are configured to allow light to enter an interior of the Calotte dome, but reduce or eliminate stray solar light from entering the interior of the Calotte dome. The Calotte dome, the baffle, and the optical window and/or filter protect the interior of the Calotte dome from external elements.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2A illustrates a baffled Calotte dome system in a first pointing orientation with a baffle oriented on the left side, according to an embodiment of the present invention.

FIG. 2B illustrates the baffled Calotte dome system of FIG. 2A in a second pointing orientation with the baffle oriented on the top, according to an embodiment of the present invention.

FIG. 14 is a block diagram illustrating a computing system configured to control a baffled Calotte dome system, according to an embodiment of the present invention.

DETAILED DESCRIPTION OF THE EMBODIMENTS

Some embodiments of the present invention pertain to a baffled Calotte dome observation and/or communications system. For instance, in some embodiments, a visible or infrared telescope and an associated imaging system, a laser, etc., may be enclosed in a Calotte dome with a baffle mounted on the opening and a window and/or filter mounted on top of the baffle. The Calotte dome steers the baffle in both elevation and azimuth, enabling the baffle and an associated imaging system, for example, to point and track objects moving on arbitrary trajectories. Examples of such objects may include, but are not limited to, stars, satellites, and/or airborne vehicles.

The baffled Calotte dome may house components configured to perform tracking, observations, and/or optical communications. In some embodiments, tracking allows for long exposure times that permit stellar fields to be imaged to fainter limiting magnitudes, improving accuracy of the navigation solution. Furthermore, redundancy is not required for the tracking system in some embodiments. This may reduce the size, weight, and power (SWAP), as well as the operating costs.

An embodiment of such a baffled Calotte dome system 200 is shown in FIGS. 2A and 2B. A window and/or filter 210 keeps debris, pollution, animals, the elements, etc. out of a baffle 220 and is mounted thereto. In optical communication applications, the role of filter 210 in some embodiments may be to limit light entering the baffle to wavelength ranges centered at the transmit and receive wavelength of the communications link. In passive imaging applications, the role of the filter in some embodiments may be to limit light to the waveband of interest. In laser guide star and/or directed energy applications, the role of the filter in some embodiments may be to limit light to the wavelength of the broadcast laser.

Figure 1A:
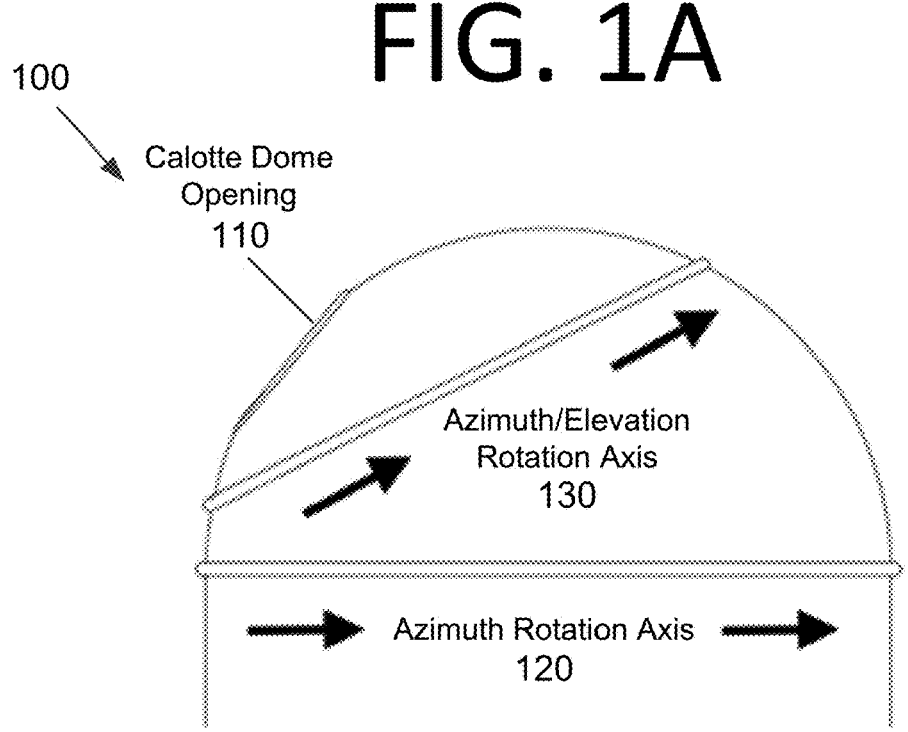
FIG. 1A illustrates a Calotte dome in a first pointing orientation with an opening oriented on the left side.
Figure 1B:
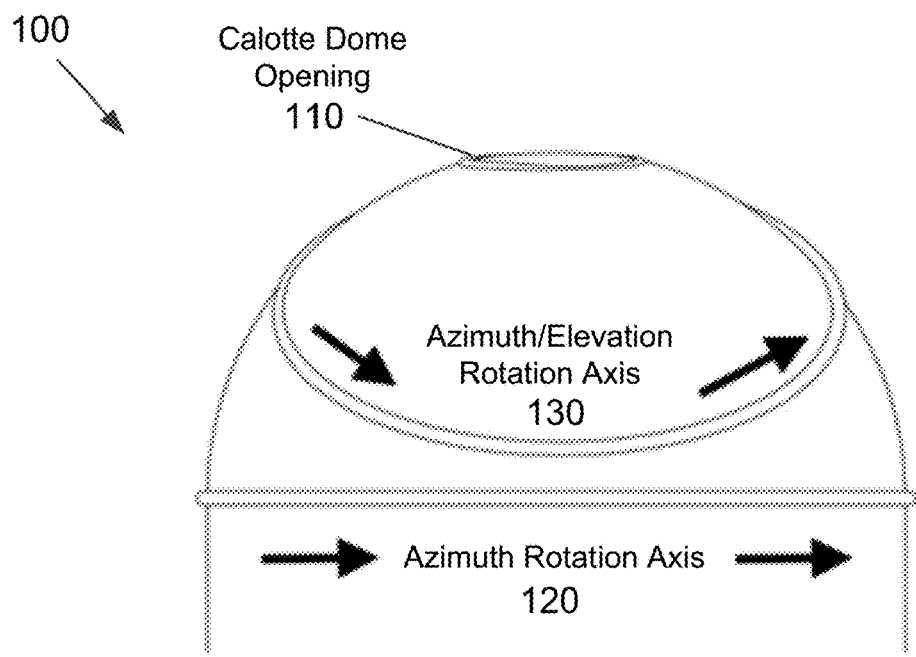
FIG. 1B illustrates the Calotte dome of FIG. 1A in a second pointing orientation with the opening oriented on the top.

Baffle 220 is mounted to an opening 230 in Calotte dome 240, which allows light passing through baffle 220 to enter the interior of Calotte dome 240. Similar to Calotte dome 100 of FIGS. 1A and 1B, azimuth rotation axis 250 controls azimuth, while azimuth/elevation rotation axis 260 controls both azimuth and elevation. However, unlike Calotte dome 100, internal components housed by Calotte dome 240 are protected from the elements at all times, and baffle 220 allows Calotte dome system 200 to perform observations, send/receive laser light, etc. without large amounts of sunlight entering window and/or filter 210 (so long as baffle 220 is not pointed too close to the sun). Also unlike Calotte dome 100, Calotte dome system 200 may house components under increased pressure, reduced pressure, or vacuum conditions.

Figure 3:
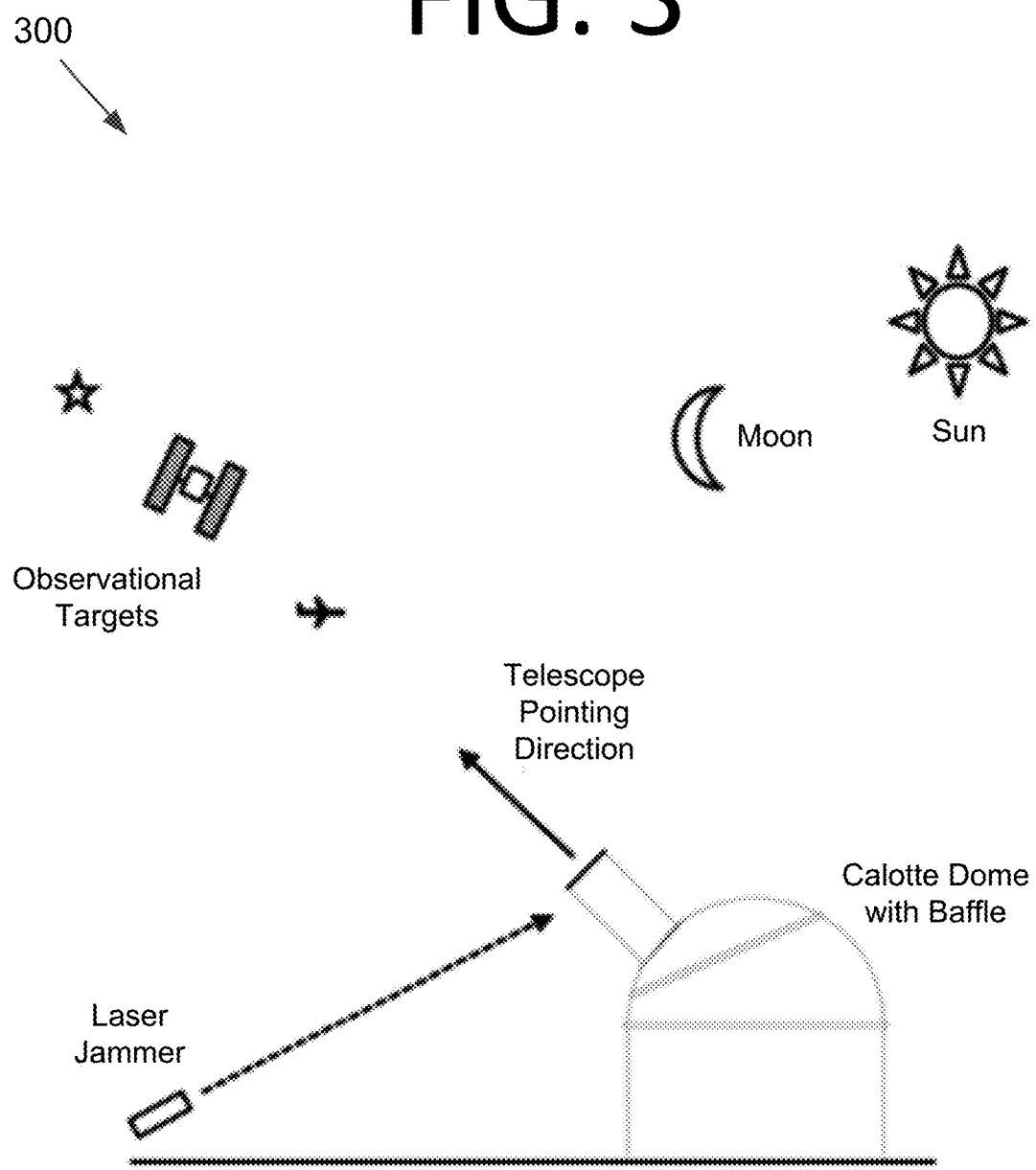
FIG. 3 illustrates a baffled Calotte dome system with a baffle that can observe targets while being shielded from stray light, improving performance against observational targets, according to an embodiment of the present invention.

Some embodiments provide significant advantages over conventional dome designs. For instance, the baffle shields the telescope and sensor system from stray light, such as sunlight, moonlight, or artificial light sources (e.g., lasers) that would otherwise degrade the performance of the telescope and sensor system enclosed within the Calotte dome. The telescope may operate during daytime by pointing and tracking objects that are separated in angle from the sun. In certain applications, these angles may be several degrees, such as when an optical communication system must establish a link to an interplanetary spacecraft nearly collinear with the Earth-sun line of sight. In other applications, this angle may be more substantial, such as when a passive sensor, a laser adaptive optics system, or a directed energy system is tracking a satellite or airplane during daytime. Calotte dome system 300 of FIG. 3 shows such a dome with a baffle that can observe targets while being shielded from light from the sun, the moon, laser jammers, etc., improving performance against observational targets, such as airplanes, satellites, stars, galaxies, etc.

Figure 4A:
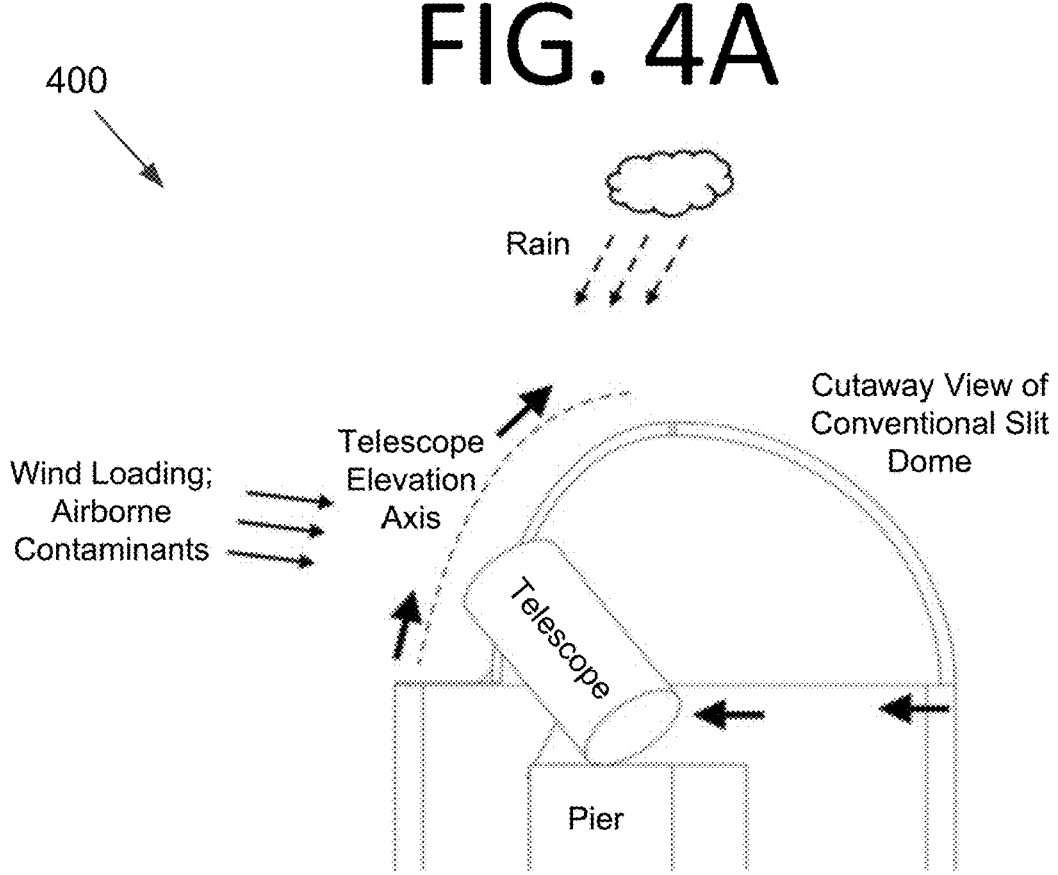
FIGS. 4A and 4B illustrate a comparison between a conventional slit dome and a baffled Calotte dome system, according to an embodiment of the present invention.
Figure 4B:
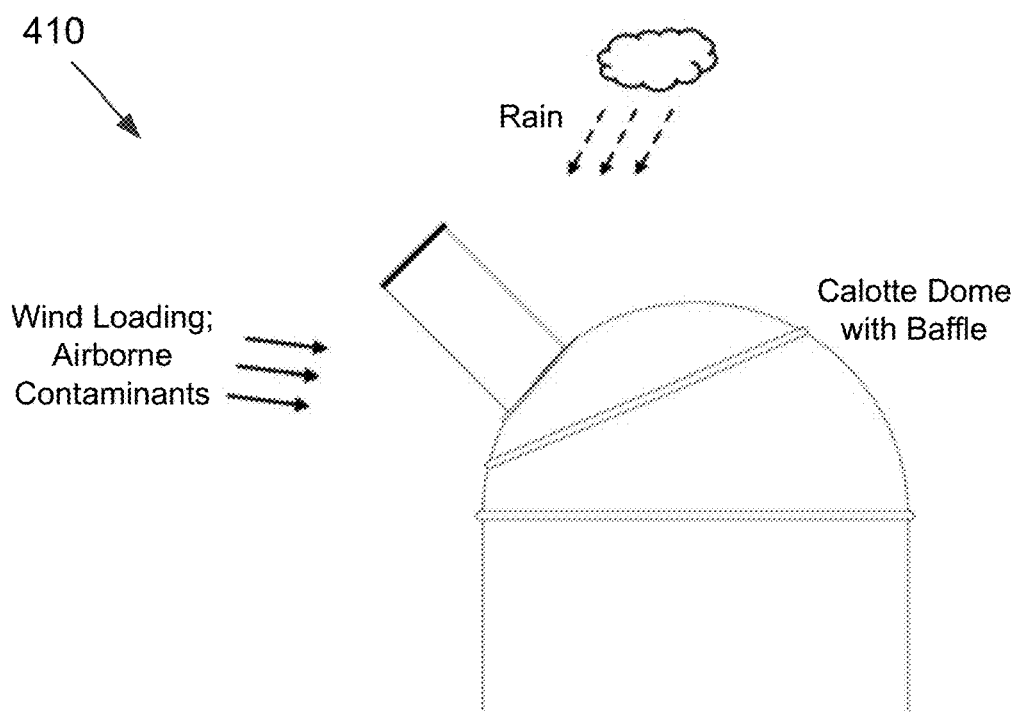

The optical window and/or filter mounted on the top of the baffle of some embodiments also provides environmental isolation for the telescope and sensor system housed within. The combined Calotte dome, baffle, and window/filter provide an enclosed space that is sealed to the external environment. This enclosure may be environmentally controlled in temperature, humidity, and/or pressure, excludes rain and airborne contaminants, and eliminates direct wind loading on the telescope. Existing dome designs, such as clamshell domes, roll-off domes, and slit domes, do not provide this environmental isolation. FIG. 4 shows a comparison between a conventional slit dome 400 and a baffled Calotte dome system 410.

Sensor systems that actively illuminate targets require lasers or other illumination sources that are broadcast from within the enclosure. Examples of active illumination systems include, but are not limited to, laser guide star adaptive optics systems used for atmospheric turbulence compensation, free space optical communication stations, LADAR (i.e., LIDAR) stations, and directed energy systems. The adaptive optics system in some embodiments may use a Rayleigh and/or sodium laser guide star to monitor atmospheric wavefront distortions for real-time correction. For these active illumination systems, the baffle defines a restricted launch geometry with hardware elevation limits ensured by the geometry of the Calotte dome. This design feature may guarantee laser eye safety for personnel in the vicinity of the Calotte dome in embodiments where laser light is emitted therefrom.

Figure 5:
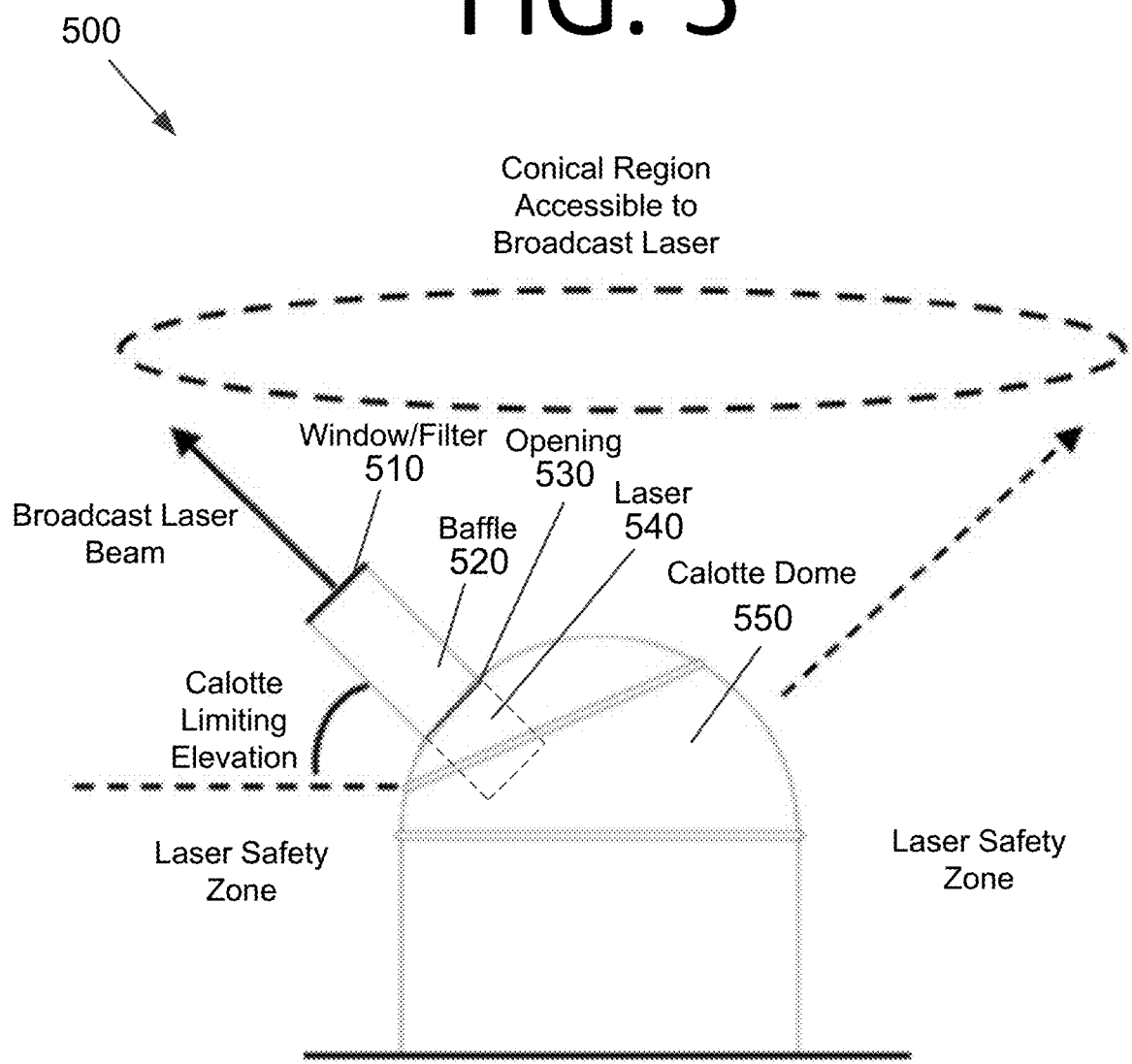
FIG. 5 illustrates a baffled Calotte dome system with a baffle design that enforces a minimal elevation angle in hardware, which ensures that lasers broadcast through the Calotte dome opening and baffle are limited to a conical region above the dome, according to an embodiment of the present invention.

Such a baffled Calotte dome system 500 is shown in FIG. 5. As with Calotte dome system 200 of FIGS. 2A and 2B, Calotte dome system 500 includes a window and/or filter 510, a baffle 520, and an opening 530. However, in this embodiment, a laser 540 is housed within Calotte dome 550. This design enforces a minimal elevation angle in hardware (the Calotte limiting elevation), which ensures that laser light transmitted through window/filter 510 by laser 540 is limited to a conical region above Calotte dome 550. This ensures a laser safety zone in the vicinity of Calotte dome 550, which is below the dashed line and arrow.

Figure 6A:
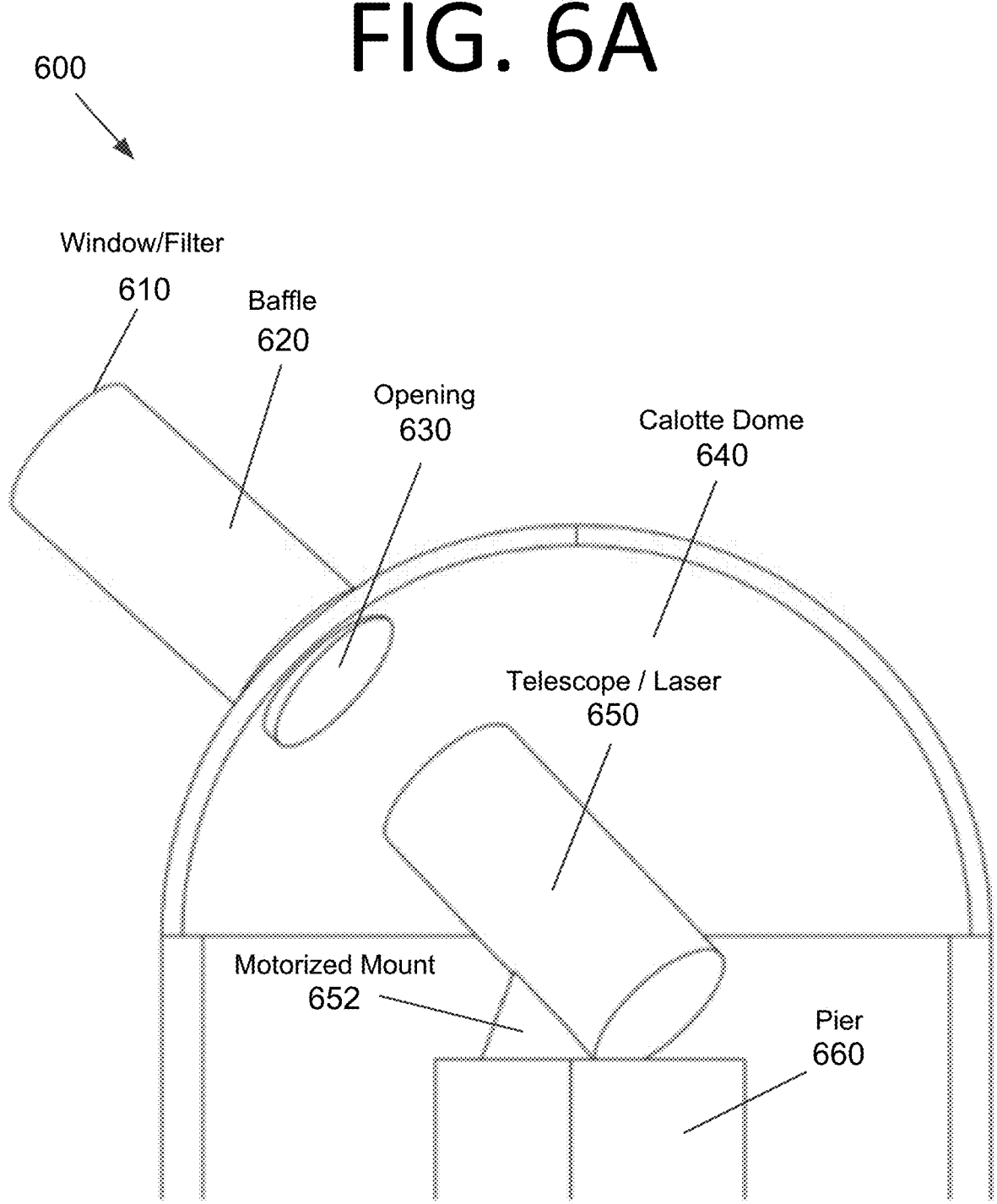
FIG. 6A illustrates a baffled Calotte dome system with an internally housed telescope in a first pointing orientation with a baffle oriented on the left side, according to an embodiment of the present invention.
Figure 6B:
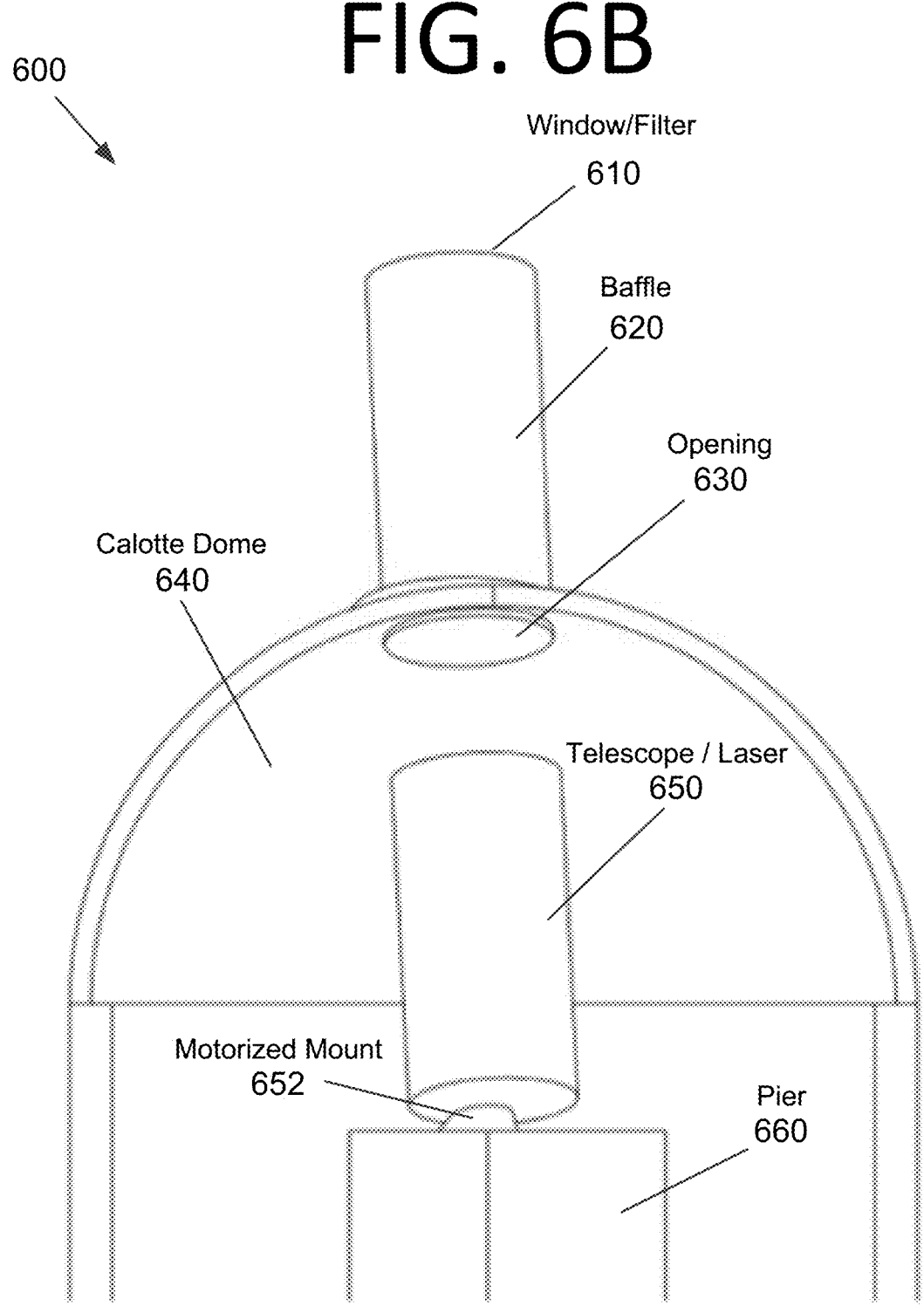
FIG. 6B illustrates the baffled Calotte dome system of FIG. 6A with the internally housed telescope in a second pointing orientation with the baffle oriented on the top, according to an embodiment of the present invention.

Components within the Calotte dome may either be freestanding within the dome or connected to the baffle or opening. A freestanding telescope embodiment of a baffled Calotte dome system 600 is shown in FIGS. 6A and 6B. Calotte dome system 600 includes a window and/or filter 610, a baffle 620, and an opening 630. Within Calotte dome 640, a telescope 650 is located on a pier 660. Telescope 650 can swivel via a motorized mount 652 to align with opening 630 and receive light therethrough. In some embodiments, Calotte dome 640 and telescope 650 are co-boresighted and driven independently so that opening 630 is always matched to a pupil (not shown) of telescope 650.

Figure 7A:
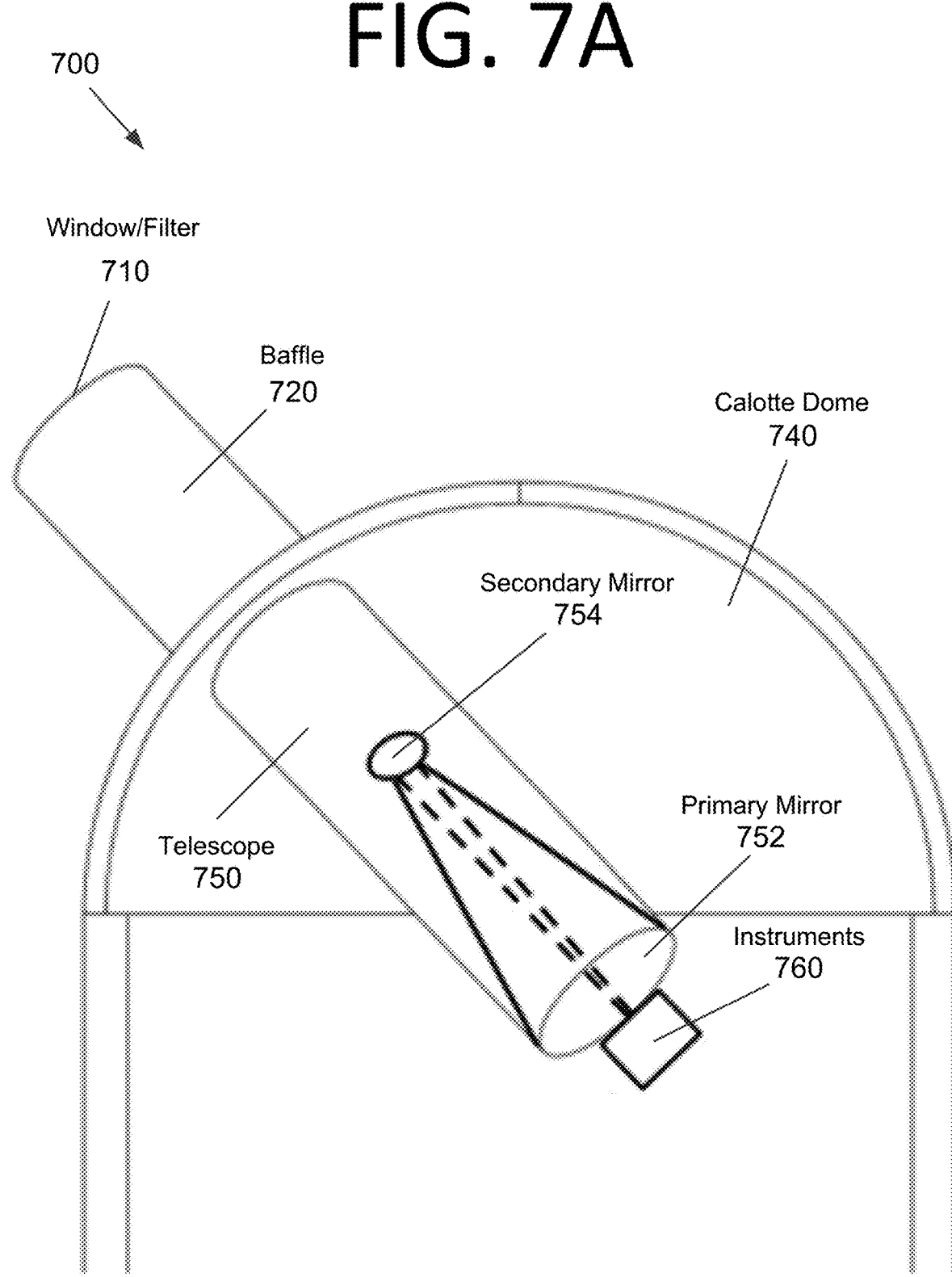
FIG. 7A illustrates a baffled Calotte dome system with a telescope connected to a Calotte dome opening in a first pointing orientation with a baffle oriented on the left side, according to an embodiment of the present invention.
Figure 7B:
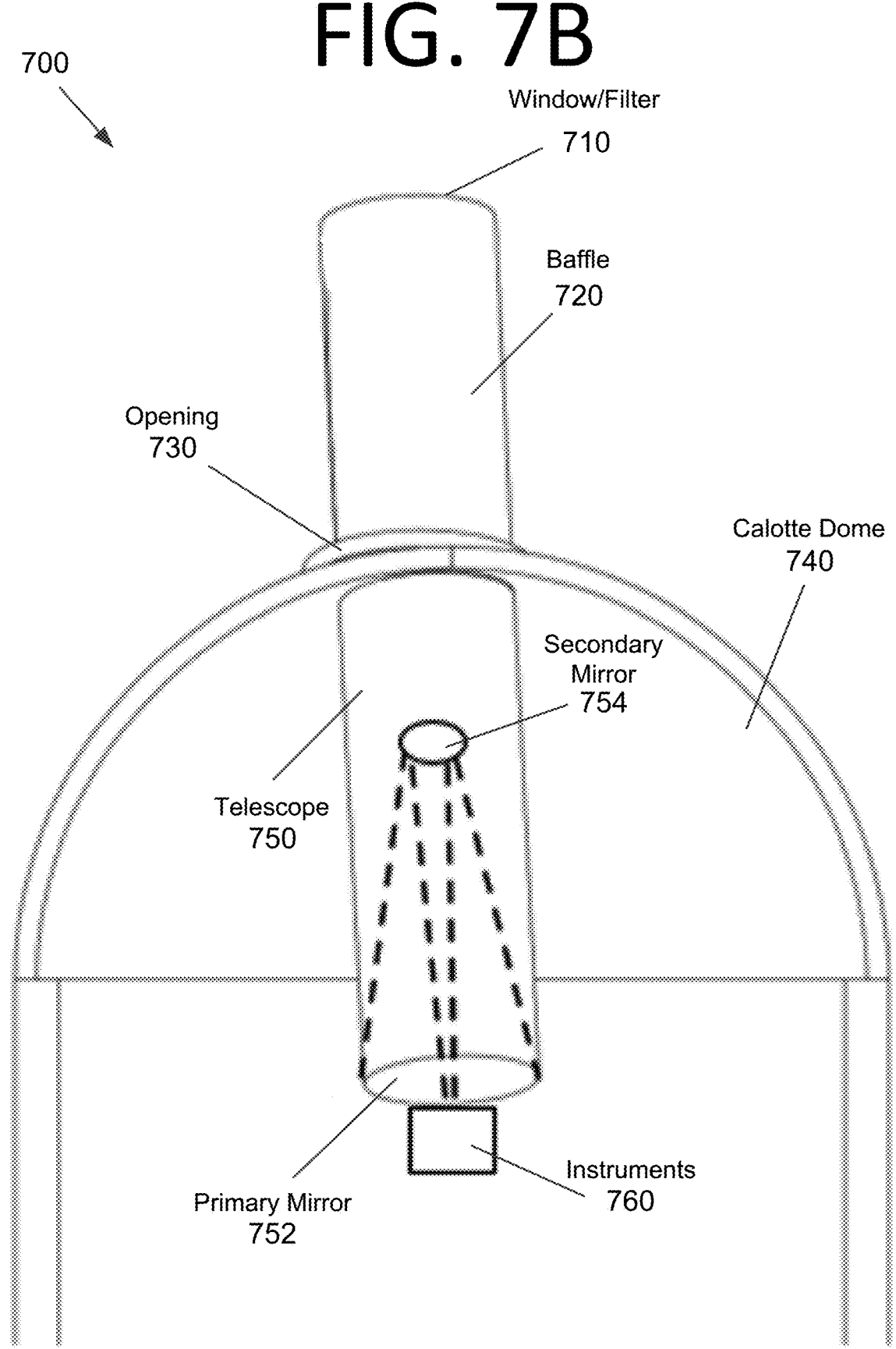
FIG. 7B illustrates the baffled Calotte dome system of FIG. 7A with the telescope connected to the Calotte dome opening in a second pointing orientation with the baffle oriented on the top, according to an embodiment of the present invention.

In some embodiments, a telescope is directly connected to the Calotte dome opening. Such a baffled Calotte dome system 700 is shown in FIGS. 7A and 7B. Calotte dome system 700 includes a window and/or filter 710, a baffle 720, and an opening 730. Within Calotte dome 740, a telescope 750 is connected to opening 730 and aligned with baffle 720. In this embodiment, telescope 750 includes a primary mirror 752 and a secondary mirror 754. However, any suitable telescope design may be used without deviating from the scope of the invention. The two axes of rotation for Calotte dome 740 become the pointing and tracking mechanism for telescope 750 in this embodiment. Instruments 760 receive and process light reflected from secondary mirror 754. For instance, instruments 760 may provide adaptive optics for atmospheric turbulence control, filtering, processing, etc.

Figure 8A:
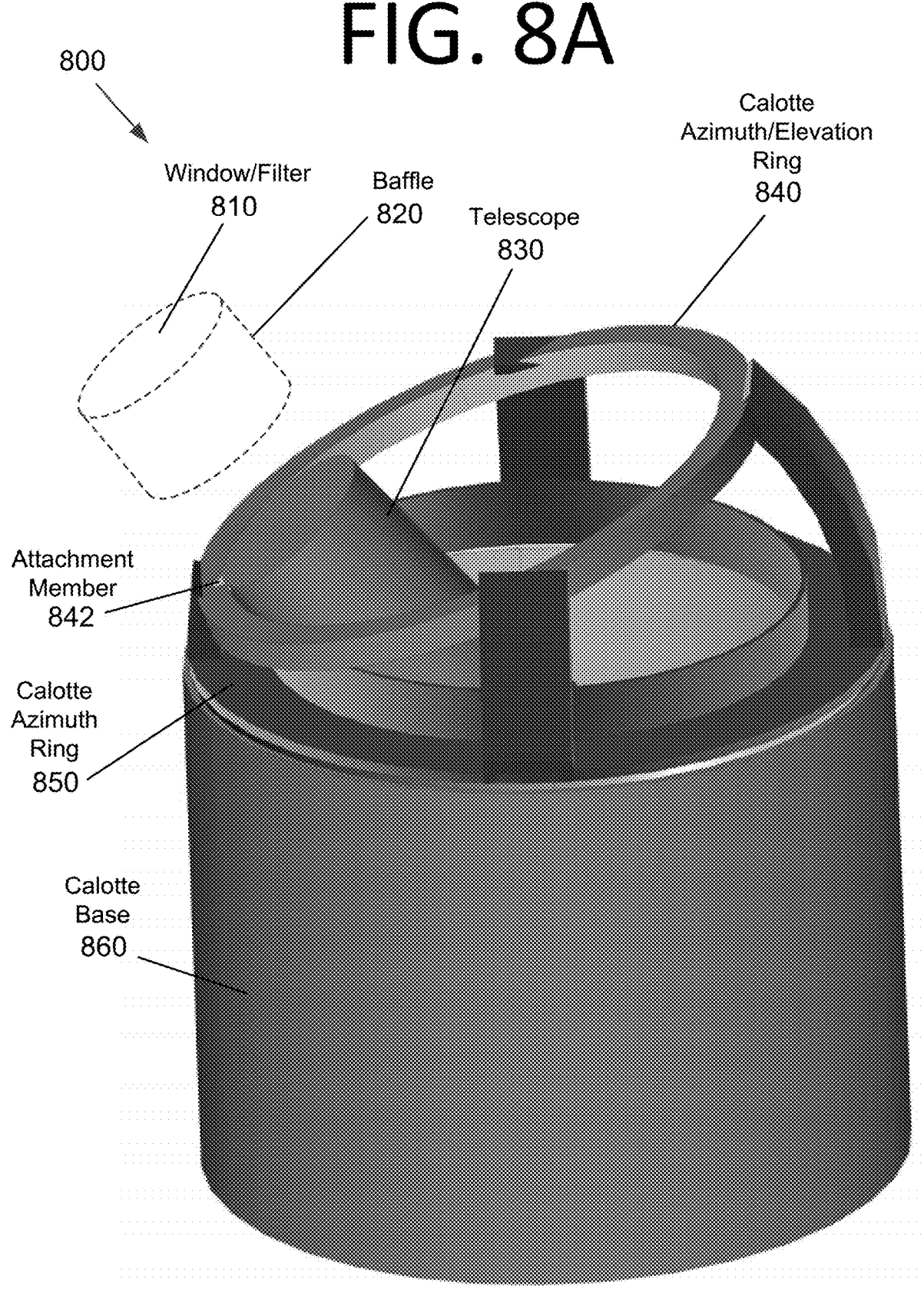
FIG. 8A is a perspective view illustrating a baffled Calotte dome system with a telescope suspended from an azimuth/elevation ring in a first pointing orientation with a baffle oriented towards the left side, according to an embodiment of the present invention.
Figure 8B:
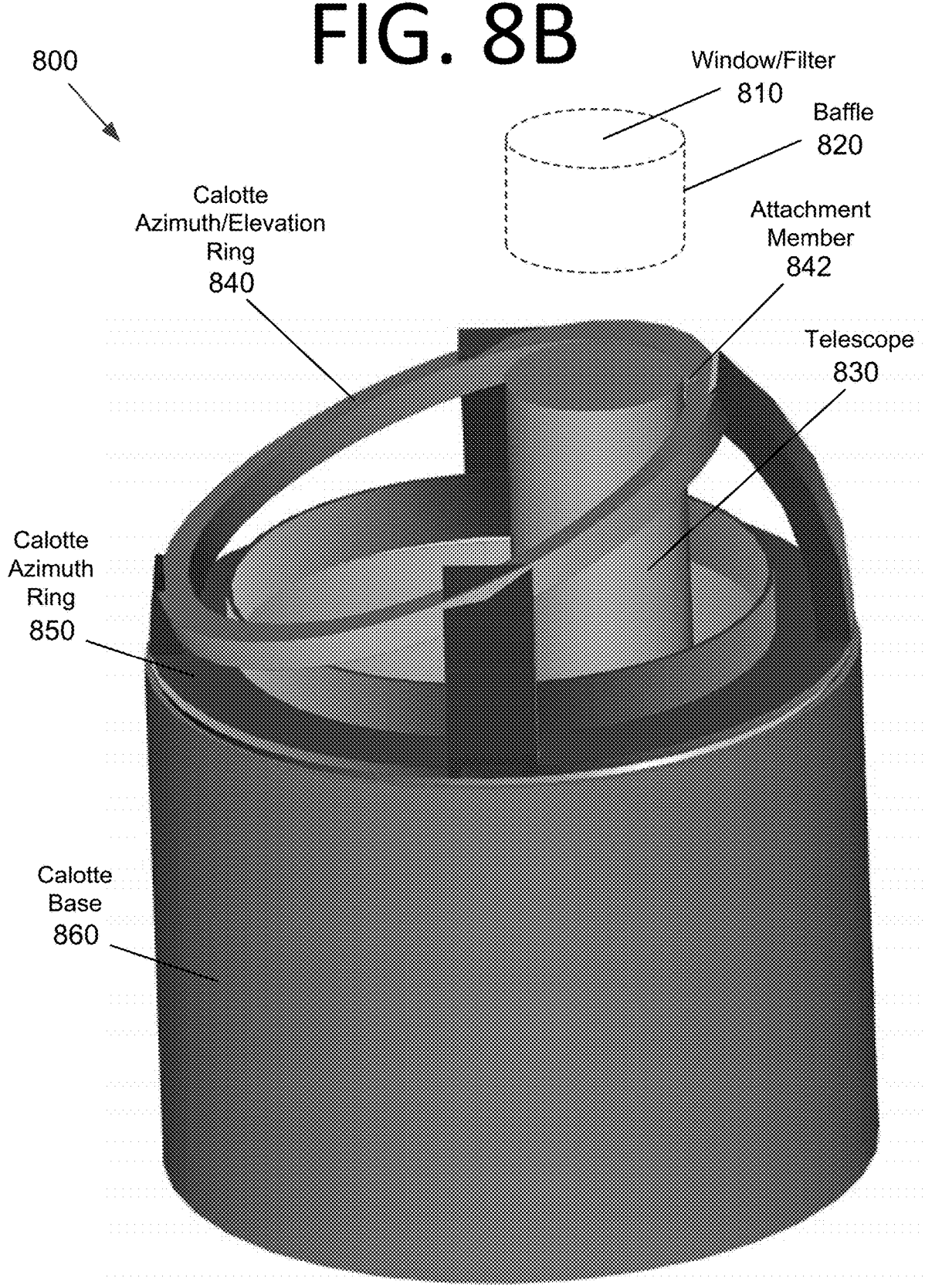
FIG. 8B is another perspective view illustrating the baffled Calotte dome system of FIG. 8A with the telescope suspended from the azimuth/elevation ring in a second pointing orientation with the baffle oriented upwards, according to an embodiment of the present invention.
Figure 9:
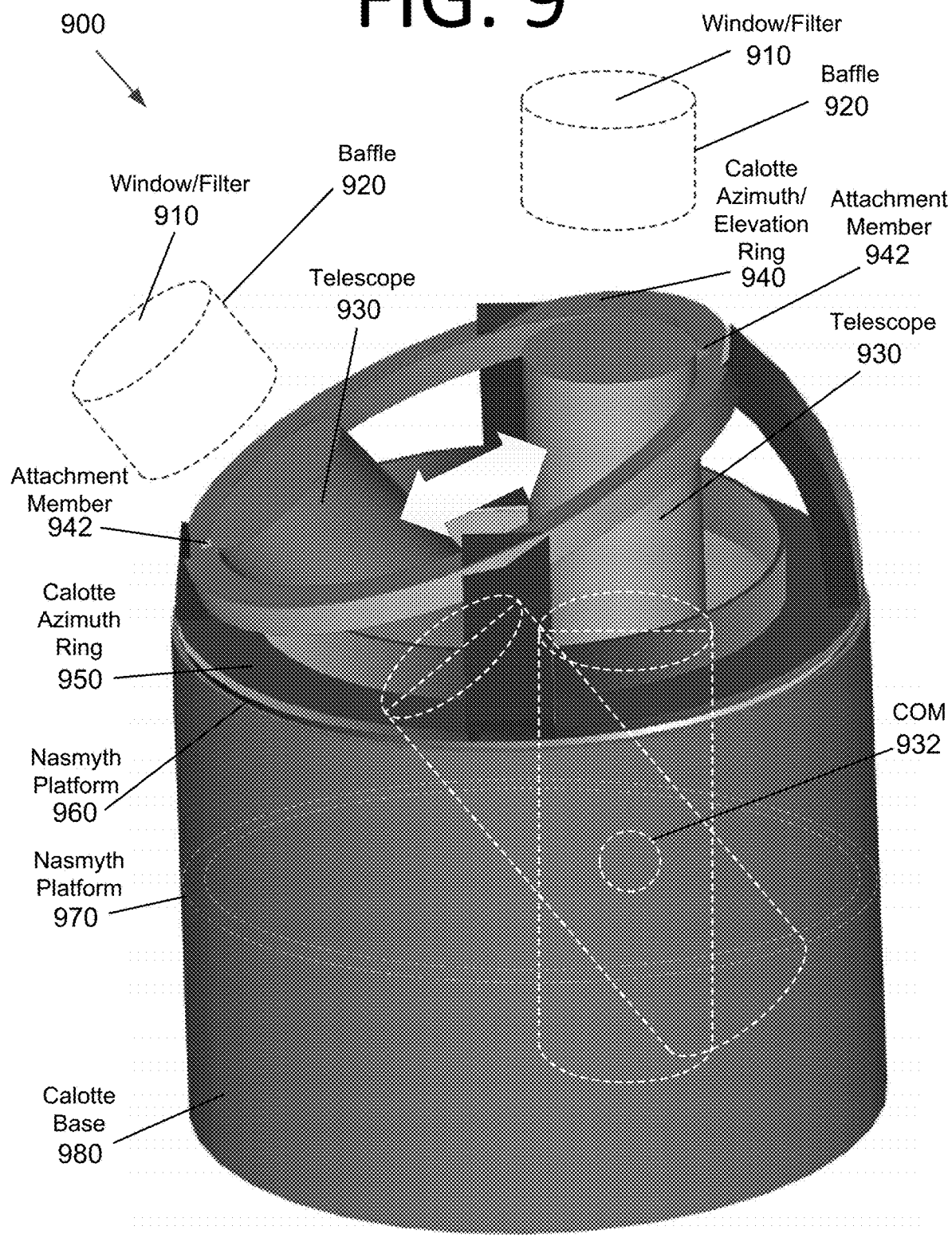
FIG. 9 is a perspective view illustrating a baffled Calotte dome system with the telescope center of mass marked and Nasmyth platforms attached to the Calotte base and Calotte azimuth rotation ring, according to an embodiment of the present invention.

In some embodiments, components within the Calotte dome may be connected to the structural base, the region of the dome that rotates in azimuth, or the region of the dome that rotates in both altitude and azimuth. These points of attachment may transport different components with respect to one another other to realize certain design advantages. One such configuration of a Calotte dome system 800 is shown in FIGS. 8A and 8B and a differently configured Calotte dome system 900 is shown in FIG. 9. Calotte dome system 800 includes a window and/or filter 810 and a baffle 820 attached to a Calotte dome, which has been removed for visual clarity. In FIG. 8A, telescope 830 is attached to a Calotte azimuth/elevation ring 840 via an attachment member 842 and pointed at the minimum elevation angle. Calotte dome system 800 also includes a Calotte azimuth ring 850 and a Calotte base 860.

Attachment member 842 may be composed of aluminum, steel, and/or carbon fiber members attached to the inside of Calotte azimuth/elevation ring 840 and designed to support telescope 830 so as to maximize structural stiffness and minimize flexure of telescope 830. A stiff, low-flexure design permits telescope 830 to maintain accurate alignment while pointing and tracking. FIGS. 8A and 8B show a single attachment point, but some embodiments of the present invention may employ multiple attachment points around the azimuth/elevation rotation ring to improve structural stiffness and minimize flexure.

FIG. 8B shows telescope 830 pointing vertically. Rotation of the Calotte azimuth/elevation ring 840 carries telescope 830 continuously from one elevation extreme to the other such that telescope 830 accesses all possible elevation angles permitted by Calotte dome system 800. As with FIG. 5, the minimum elevation angle may be configured to provide a safe zone around Calotte dome system 800 in the event that a laser is included.

FIG. 9 shows a Calotte dome system 900 with telescope 930 at both vertical and minimum elevation positions. Calotte dome system 900 includes a window and/or filter 910 and a baffle 920 operably connected to the Calotte dome, which has been removed for visual clarity. Telescope 930 is attached to a Calotte azimuth/elevation ring 940 via an attachment member 942. Calotte dome system 900 also includes a Calotte base 980.

In FIG. 9, a Calotte azimuth ring 950 is mounted on a Nasmyth platform 960. A second Nasmyth platform 980 is mounted on Calotte base 980. However, in some embodiments, only one Nasmyth platform is used.

In traditional altitude/azimuth telescope designs, a flat mirror is placed after the secondary mirror and reflects light collected by the primary towards instruments (e.g., cameras, spectrographs, etc.) on the Nasmyth platform. This mirror articulates as the telescope tracks so as to continuously direct light into the instrumentation. This design permits instrumentation to be maintained under fixed gravity load, which minimizes the internal flexure of the instrument that would otherwise degrade optical performance. In the embodiment shown in FIG. 9, a Nasmyth platform is affixed to the azimuth ring and/or to the dome itself. One or more flat mirrors mounted on the telescope may redirect light to instrumentation mounted on one of these Nasmyth platforms, where this instrumentation may operate under fixed gravity load. The flat mirrors articulate as the telescope tracks so as to continuously direct light into the instrumentation. This may provide an advantage for some applications over the embodiment shown in FIGS. 7A and 7B, where the instrumentation is under variable gravity load as the telescope points and tracks.

The embodiment shown in FIG. 9 may have certain design advantages. For instance, the center of rotation of telescope 930 may be located at or near the center of mass (COM) 932 of telescope 930, and in the vicinity of the primary mirror (not shown). This provides an advantage in balancing telescope 930 so as to minimize torque and deflection under gravity load. Nasmyth platforms 960, 970 provide an advantage in mounting instrumentation and/or other equipment under a fixed gravity vector.

Figure 10:
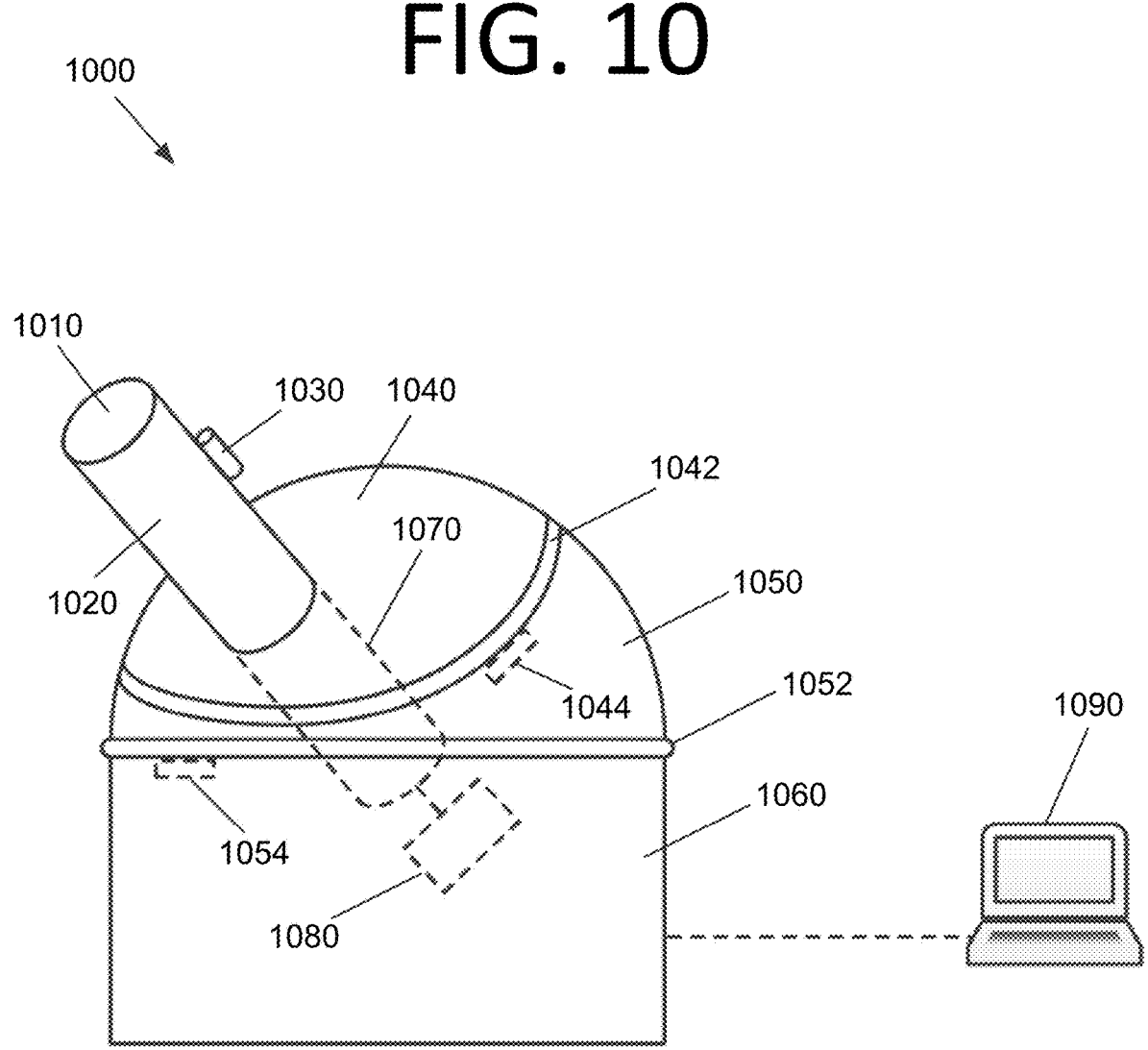
FIG. 10 is a perspective view illustrating a baffled Calotte dome system, according to an embodiment of the present invention.

FIG. 10 is a perspective view illustrating a baffled Calotte dome system 1000, according to an embodiment of the present invention. Calotte dome system 1000 includes a window and/or filter 1010, a baffle 1020, and an opening (not visible). However, in this embodiment, a laser 1030 is mounted to baffle 1020 and aligned so as to be received by a distant target (e.g., a space vehicle, a rover, etc.). However, in some embodiments, laser 1030 may be independently targetable and/or mounted to a different location on the Calotte dome.

Calotte dome system 1000 includes an azimuth/elevation rotation portion 1040 that controls both azimuth and orientation, an azimuth rotation portion 1050 that azimuth only, and a base 1060 that supports azimuth rotation portion 1050. Collectively, azimuth/elevation rotation portion 1040, azimuth rotation portion 1050, and base 1060 constitute the Calotte dome. Azimuth/elevation rotation portion 1040 includes a rotation mechanism 1042 (e.g., gears, electromagnetic mechanisms, etc.) that facilitates rotation of azimuth/elevation rotation portion 1040 via a drive mechanism 1044 (e.g., a motor). Azimuth rotation portion 1050 also includes a rotation mechanism 1052 (e.g., gears, electromagnetic mechanisms, etc.) that facilitates rotation of azimuth rotation portion 1050 via a drive mechanism 1054 (e.g., a motor).

In this embodiment, a telescope 1070 is operably connected to the opening, baffle 1020, or both. However, in some embodiments, telescope may be separated from the opening and baffle 1020 in a similar manner to that depicted in FIGS. 7A and 7B. Instruments 1080 receive and process light from telescope 1070. A computing system 1090 controls the operation of drive mechanism 1044, drive mechanism 1054, telescope 1070, and instruments 1080. In some embodiments, computing system 1090 may be computing system 1400 of FIG. 14. Computing system 1090 may be housed within the Calotte dome or external to the Calotte dome as a matter of design choice, and may control Calotte dome system via a wired and/or wireless connection.

One or two-way optical communications are possible, in addition to or in lieu of observational capabilities. For instance, some embodiments may send and/or receive optical communications from distant vehicles, such as space vehicles, rovers on the moon, another planet, or another celestial body (e.g., asteroids, other moons, comets, etc.). Use of baffling in embodiments of the present invention provides stray light suppression not realized in conventional Calotte dome systems. Table 1 below provides adaptive optics scenarios and example receiver terminal apertures in meters for some nonlimiting applications.

TABLE 1

EXAMPLE RECEIVER TERMINAL APERTURES

| LEO | Lunar | L2 | L1 | Mars | Single Relay Optical FL |
|---|---|---|---|---|---|
| 0.4 | 1 | 1 | 1 | 12 | 1 |

A single relay optical feeder link (FL) is an intermediate spacecraft that relays signals from one station to another. The relay may be designed to move data between points on the Earth that do not have a direct line of sight with respect to one another. Thus, an intermediate link to the intermediate spacecraft is made. A FL may also relay data between satellites or other communicating systems. For instance, a rover on Mars may communicate with a Mars-orbiting satellite, which then communicates with systems on Earth.

Adaptive optics systems may not be required for apertures smaller than 1 meter. However, there are a variety of considerations bearing on this, as receiver system performance depends critically on laser beacon brightness, site, communication wavelength, turbulence conditions, etc. A requirement on high fractional uptime drives the design towards an adaptive optics solution.

Figure 11:
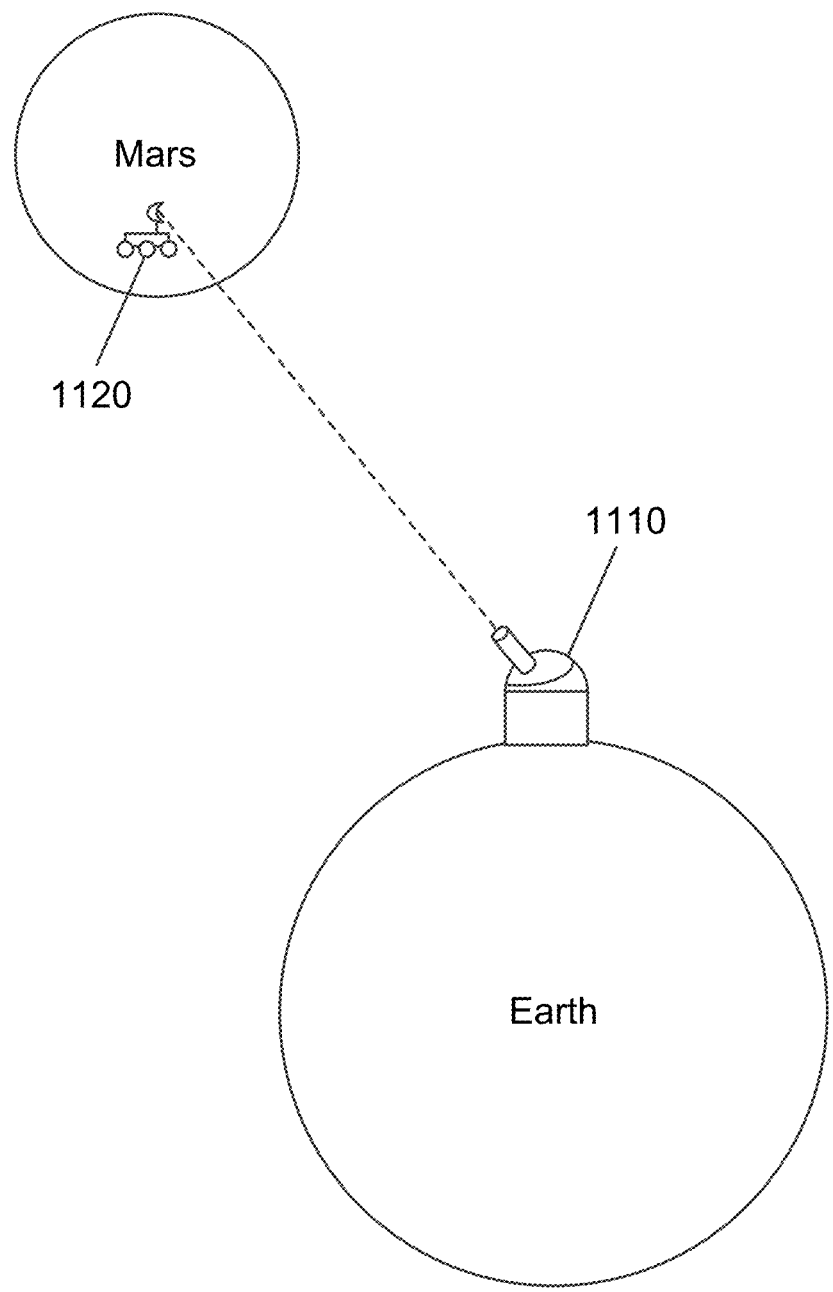
FIG. 11 illustrates a communications scenario where an Earth-based ground station is communicating with a rover on Mars, according to an embodiment of the present invention.

In some embodiments, deep space optical communications applications may require operation at pointing angles that are close to the sun. For instance, consider communication scenario 1100 of FIG. 11, where an Earth-based ground station 1110 is communicating with a rover 1120 on Mars. This scenario may be addressed using a Calotte dome with a laser line coated filter for solar rejection. This filter may act to suppress light outside of a relatively narrow band of laser light employed for the communication link. In this case, an adaptive optics-equipped telescope may use the laser signal from rover 920 at Mars as a guide star for turbulence compensation.

Figure 12:
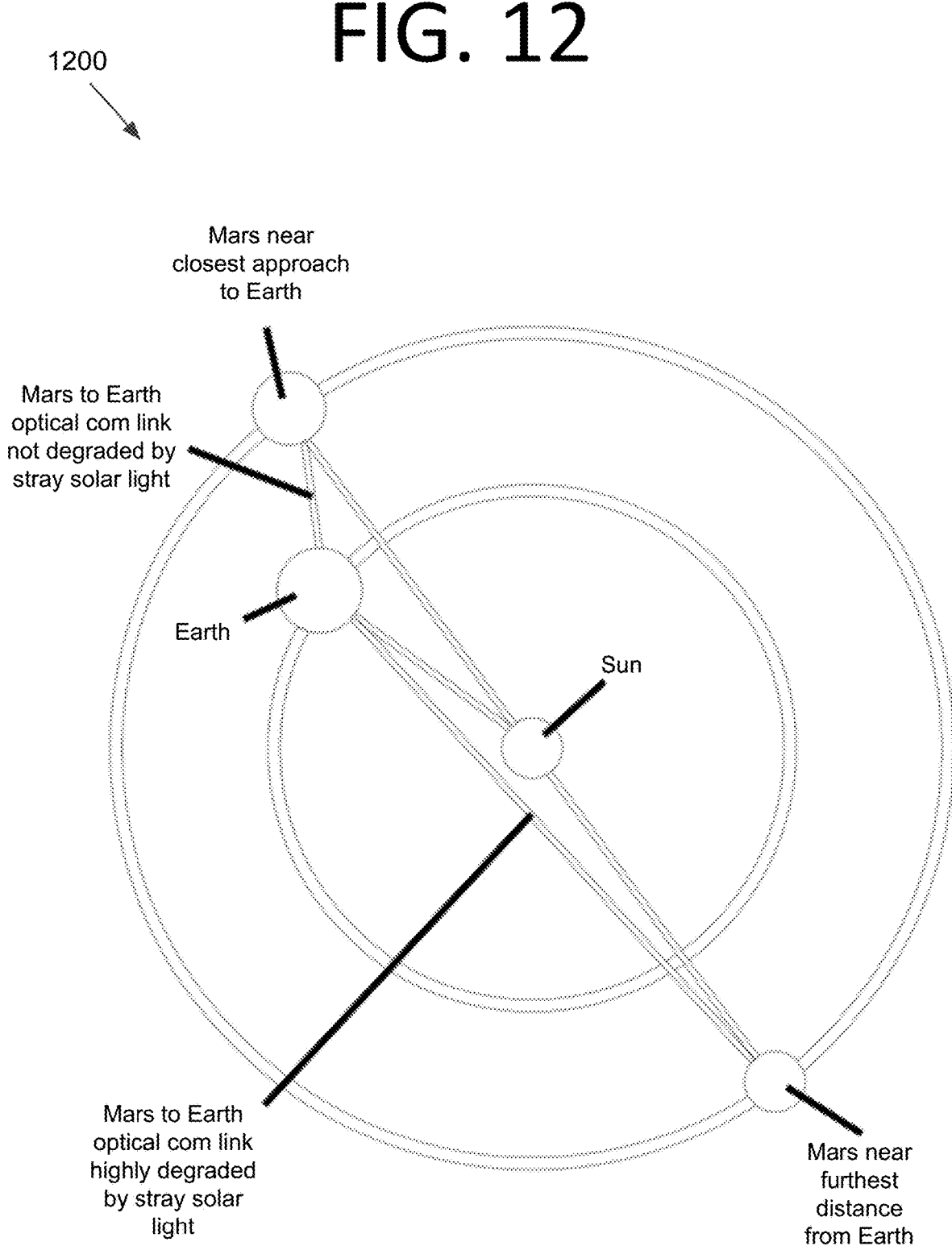
FIG. 12 illustrates a communication scenario where an Earth-based ground station utilizing a Calotte dome is communicating with an interplanetary spacecraft in which the line of sight between the spacecraft and the Calotte dome is at times very close to the sun, according to an embodiment of the present invention.

Alternatively, communications may occur between a rover and an orbiting satellite, which then communicates with Earth-based systems. Such a scenario 1200 is shown in FIG. 12. In FIG. 12, an Earth-based ground station utilizing a Calotte dome communicates with an interplanetary spacecraft in which the line of sight between the spacecraft and the Calotte dome is at times very close to the sun. At certain times in their orbits, the path between Earth and Mars will be such that stray solar light from the sun significantly degrades communications. A baffled system, such as many embodiments of the present invention, may help to block much or all of the stray solar light and facilitate communications.

The number of ground terminals required to transmit data at a certain percentage (PDT) depends on the application. The number of stations is determined by the ground-space contact time and is penalized by weather conditions (e.g., the station is clouded out a certain percentage of the time). The metric assumes communication to a single satellite. The PDT and number of ground stations required to achieve PDT for various applications is shown in Table 2 below.

TABLE 1

REQUIRED GROUND STATIONS FOR PDT

| | LEO | Lunar | L2 | L1 | Mars | Single Relay Optical FL |
|---|---|---|---|---|---|---|
| PDT | 94.8% | 97.4% | 99.9% | 98.5% | 98.0% | 99.0% |
| Stations | 7 | 2 | 2 | 2 | 2 | 3 |

Figure 13:
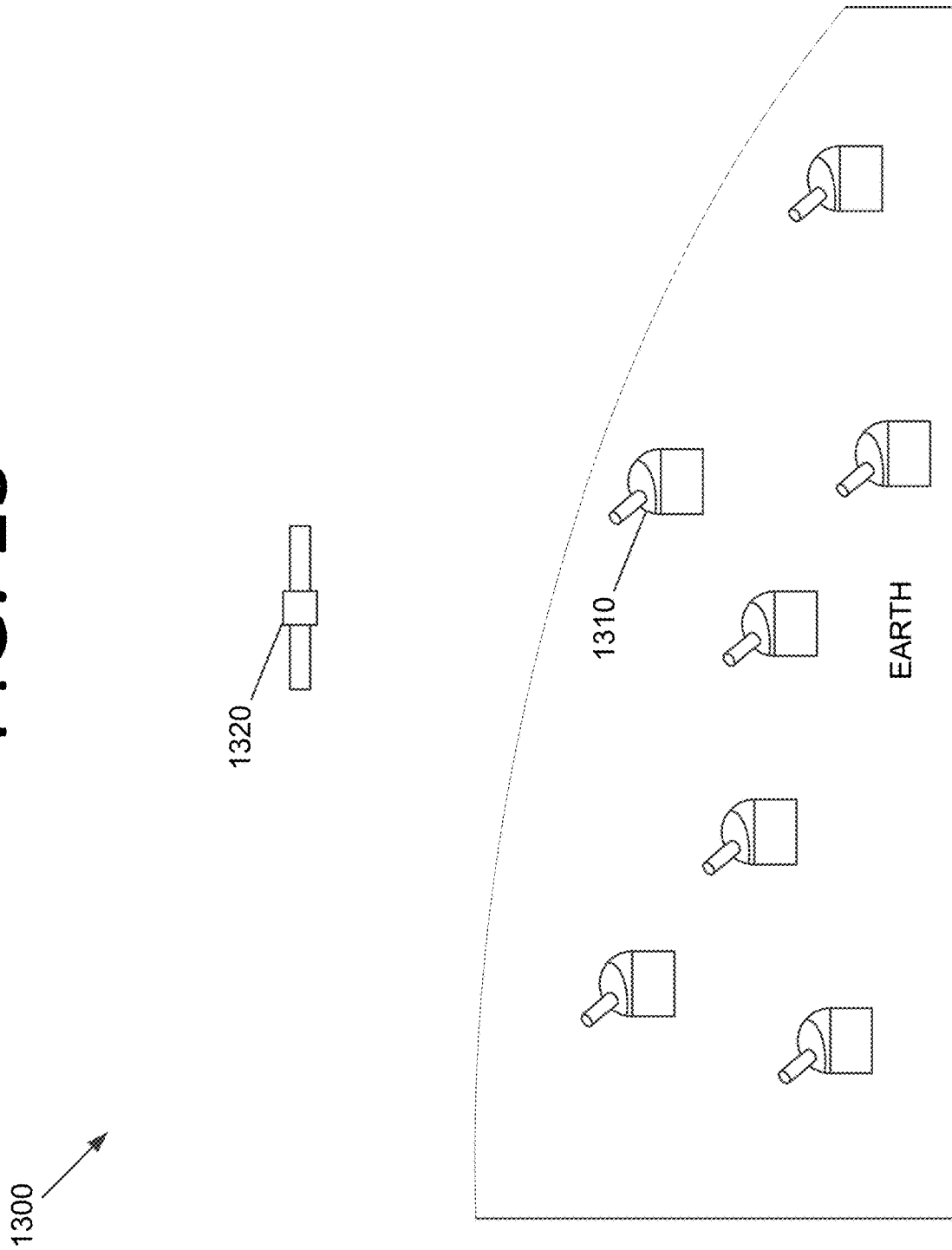
FIG. 13 illustrates ground stations required for low Earth orbit (LEO) communications with a single space vehicle, according to an embodiment of the present invention.

For instance, as shown in scenario 1300 of FIG. 13, seven ground stations 1310 are required for a single LEO space vehicle 1320 to realize the desired PDT.

Constellations currently under consideration for certain applications contain hundreds or thousands of satellites. Optical communication for these large constellations requires a significant number of ground stations: to the zeroth order, row 2 in Table 2 is multiplied by the number of satellites in the constellation. For instance, a low Earth orbit (LEO) constellation of 1,000 satellites requires 7,000 well-placed ground stations to achieve the 94.8% PDT listed above. Some embodiments address this need via a baffled Calotte dome system that provides a day/night satellite tracking system that offers environmental control via a laser line filter window and adaptive optics (if desired or necessary).

FIG. 14 is a block diagram illustrating a computing system configured to control a baffled Calotte dome system, according to an embodiment of the present invention. Computing system 1400 includes a bus 1405 or other communication mechanism for communicating information, and processor(s) 1410 coupled to bus 1405 for processing information. In this context, bus 1405 may be a wireless communication bus among the operating systems and modules. A wireless bus permits information to be transferred among computers and modules mounted on different rotating sections of the Calotte dome, thereby eliminating the need for cabling that would require the provision of cable wraps or slip rings for data transfer.

Processor(s) 1410 may be any type of general or specific purpose processor, including, but not limited to, a central processing unit (CPU), as system on a chip (SoC), and/or an application specific integrated circuit (ASIC). Processor(s) 1410 may also have multiple processing cores, and at least some of the cores may be configured to perform specific functions. Multi-parallel processing may be used in some embodiments. Computing system 1400 further includes a memory 1415 for storing information and instructions to be executed by processor(s) 1410. Memory 1415 can be comprised of any combination of random access memory (RAM), read only memory (ROM), flash memory, cache, static storage such as a magnetic or optical disk, or any other types of non-transitory computer-readable media or combinations thereof. Non-transitory computer-readable media may be any available media that can be accessed by processor(s) 1410 and may include volatile media, non-volatile media, removable media, and/or non-removable media. Additionally, computing system 1400 includes a communication device 1420, such as a transceiver and antenna, a network card, etc., to wirelessly provide access to a communications network. Computing system 1400 may also incorporate a GPS receiver and/or an inertial measurement unit to provide geolocation and orientation data.

Processor(s) 1410 are further coupled via bus 1405 to a display 1425, such as a Liquid Crystal Display (LCD), for displaying information to a user. A keyboard 1430 and a cursor control device 1435, such as a computer mouse, are further coupled to bus 1405 to enable a user to interface with computing system 1400. However, in certain embodiments such as those for mobile computing implementations, a physical keyboard and mouse may not be present, and the user may interact with the device solely through display 1425 and/or a touchpad (not shown). Any type and combination of input devices may be used as a matter of design choice.

Memory 1415 stores software modules that provide functionality when executed by processor(s) 1410. The modules include an operating system 1440 for computing system 1400. The modules further include a baffled Calotte dome system control module 1445 that is configured to control a baffled Calotte dome system. For instance, control module 1445 may control rotation of the Calotte dome and orientation of the baffle, telescope pointing and target acquisition, laser communications, instruments, etc. Computing system 1400 may include one or more additional functional modules 1450 that include additional functionality.

One skilled in the art will appreciate that a "system" could be embodied as an embedded computing system, a personal computer, a server, a console, a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a Calotte dome comprising an opening;
   a baffle operably connected to the opening of the Calotte dome at a proximal end of the baffle;
   an optical window and/or filter operably connected to a distal end of the baffle;
   an azimuth/elevation ring; and
   an azimuth/elevation rotation portion operably connected to the azimuth/elevation ring, the azimuth/elevation rotation portion configured to rotate about an azimuth/elevation control axis defined by the azimuth/elevation ring via a first rotation mechanism, wherein
   the baffle and the optical window and/or filter are configured to allow light to enter an interior of the Calotte dome, but reduce or eliminate stray solar light from entering the interior of the Calotte dome, and
   the Calotte dome, the baffle, and the optical window and/or filter protect the interior of the Calotte dome from external elements.

2. The apparatus of claim 1, further comprising:
   an azimuth ring; and
   an azimuth rotation portion operably connected to the azimuth ring, the azimuth rotation portion configured to rotate about an azimuth control axis defined by the azimuth ring via a second rotation mechanism, wherein
   the azimuth/elevation ring is operably connected to the azimuth ring.

3. The apparatus of claim 2, wherein the Calotte dome further comprises:
   a base supporting the azimuth rotation portion.

4. The apparatus of claim 2, further comprising:
   a computing system configured to control rotation of azimuth/elevation rotation portion and the azimuth rotation portion via the first rotation mechanism and the second rotation mechanism, respectively.

5. The apparatus of claim 1, wherein
   the baffle is operably connected to the azimuth/elevation rotation portion, and
   the baffle and the azimuth/elevation rotation portion are configured to define a minimum elevation angle where light cannot enter or leave the baffle below the minimum elevation angle.

6. The apparatus of claim 1, further comprising:
   a laser or a telescope housed within the Calotte dome and operably connected to or aligned with the opening, the baffle, or both.

7. The apparatus of claim 6, further comprising:
   an attachment member that attaches the laser or the telescope to the azimuth/elevation ring such that the laser or telescope rotates with the azimuth/elevation ring.

8. The apparatus of claim 1, further comprising:
   a Nasmyth platform configured to facilitate mounting of equipment under a fixed gravity vector; and
   an azimuth ring mounted on the Nasmyth platform.

9. The apparatus of claim 1, further comprising:
   a base; and
   a Nasmyth platform mounted on the base, the Nasmyth platform configured to facilitate mounting of equipment under a fixed gravity vector.

10. The apparatus of claim 1, further comprising:
    a telescope housed within the Calotte dome and operably connected to or aligned with the opening, the baffle, or both; and
    instruments configured to provide adaptive optics for atmospheric turbulence control, filtering, and/or processing.

11. The apparatus of claim 1, further comprising:
    a telescope housed within the Calotte dome, wherein
    a center of rotation of the telescope is located at or near a center of mass of the telescope to minimize torque and deflection under gravity load.

12. A Calotte dome system, comprising:
    a Calotte dome comprising an opening;
    a baffle operably connected to the opening of the Calotte dome at a proximal end of the baffle;
    optical window and/or filter operably connected to a distal end of the baffle; and
    a telescope or a laser housed within an interior of the Calotte dome and operably connected to the opening, the baffle, or both, wherein
    the baffle and the optical window and/or filter are configured to allow light to enter the telescope or allow laser light to be emitted, the Calotte dome, the baffle, and the optical window and/or filter protect an interior of the Calotte dome from external elements, and a center of rotation of the telescope is located at a center of mass of the telescope to minimize torque and deflection under gravity load.

13. The Calotte dome system of claim 12, wherein the Calotte dome comprises:

an azimuth/elevation rotation portion configured to rotate about an azimuth/elevation control axis via a first rotation mechanism; and an azimuth rotation portion configured to rotate about an azimuth control axis via a second rotation mechanism.

14. The Calotte dome system of claim 13, wherein the baffle is operably connected to the azimuth/elevation rotation portion, and the baffle and the azimuth/elevation rotation portion are configured to define a minimum elevation angle where light cannot enter or leave the baffle below the minimum elevation angle.

15. The Calotte dome system of claim 13, wherein the Calotte dome further comprises:

a base supporting the azimuth rotation portion.

16. The Calotte dome system of claim 13, further comprising:

a computing system configured to control rotation of azimuth/elevation rotation portion and the azimuth rotation portion via the first rotation mechanism and the second rotation mechanism, respectively.

17. A Calotte dome system, comprising:

a Calotte dome comprising an opening;

a baffle operably connected to the opening of the Calotte dome at a proximal end of the baffle;

optical window and/or filter operably connected to a distal end of the baffle;

a laser housed within an interior of the Calotte dome and spaced apart from and aligned with the opening and the baffle;

an azimuth/elevation ring; and an azimuth/elevation rotation portion operably connected to the azimuth/elevation ring, the azimuth/elevation rotation portion configured to rotate about an azimuth/elevation control axis defined by the azimuth/elevation ring via a first rotation mechanism, wherein the baffle and the optical window and/or filter are configured to allow laser light to be emitted, the Calotte dome, the baffle, and the optical window and/or filter protect an interior of the Calotte dome from external elements, and the Calotte dome system is configured to provide elevation limits for the laser via the azimuth/elevation ring.

18. The Calotte dome system of claim 17, further comprising:

a pier; and a motorized mount operably connected to the pier and the laser, the motorized mount configured to move the laser to maintain alignment with the opening.

19. The Calotte dome system of claim 18, wherein the opening and the laser are co-boresighted and driven independently so that the opening is always aligned with the laser.

20. The Calotte dome system of claim 17, further comprising:

an azimuth rotation portion operably connected to the azimuth ring, the azimuth rotation portion configured to rotate about an azimuth control axis defined by the azimuth ring via a second rotation mechanism, wherein the azimuth/elevation ring is operably connected to the azimuth ring.

21. The Calotte dome system of claim 20, wherein the Calotte dome further comprises:

a base supporting the azimuth rotation portion.

22. The Calotte dome system of claim 20, further comprising:

a computing system configured to control rotation of azimuth/elevation rotation portion and the azimuth rotation portion via the first rotation mechanism and the second rotation mechanism, respectively.

23. The Calotte dome system of claim 20, wherein a center of rotation of the telescope is located at or near a center of mass of the telescope to minimize torque and deflection under gravity load.

24. The Calotte dome system of claim 17, wherein the baffle is operably connected to the azimuth/elevation rotation portion, and the baffle and the azimuth/elevation rotation portion are configured to define a minimum elevation angle where light cannot enter or leave the baffle below the minimum elevation angle.

25. A Calotte dome system, comprising:

a Calotte dome comprising an opening;

a baffle operably connected to the opening of the Calotte dome at a proximal end of the baffle;

an optical window and/or filter operably connected to a distal end of the baffle;

an azimuth/elevation ring housed within the Calotte dome;

an azimuth/elevation rotation portion operably connected to the azimuth/elevation ring, the azimuth/elevation rotation portion configured to rotate about an azimuth/elevation control axis defined by the azimuth/elevation ring via a first rotation mechanism;

an azimuth ring;

an azimuth rotation portion operably connected to the azimuth ring, the azimuth rotation portion configured to rotate about an azimuth control axis defined by the azimuth ring via a second rotation mechanism;

a telescope or a laser housed within the Calotte dome; and an attachment member that attaches the laser or the telescope to the azimuth/elevation ring such that the laser or telescope rotates with the azimuth/elevation ring, wherein the baffle and the optical window and/or filter are configured to allow light to enter an interior of the Calotte dome, but reduce or eliminate stray solar light from entering the interior of the Calotte dome, the Calotte dome, the baffle, and the optical window and/or filter protect the interior of the Calotte dome from external elements, and the azimuth/elevation ring is operably connected to the azimuth ring.

26. The Calotte dome system of claim 25, further comprising:

a Nasmyth platform configured to facilitate mounting of equipment under a fixed gravity vector; and an azimuth ring mounted on the Nasmyth platform.

27. The Calotte dome system of claim 25, further comprising:

a base; and a Nasmyth platform mounted on the base, the Nasmyth platform configured to facilitate mounting of equipment under a fixed gravity vector.

28. The Calotte dome system of claim 25, wherein
a center of rotation of the telescope is located at or near a center of mass of the telescope to minimize torque and deflection under gravity load.

* * * * *